W. WRIGHT.
COMBINED TYPE WRITING AND COMPUTING MACHINE.
APPLICATION FILED NOV. 17, 1911.

1,259,819.

Patented Mar. 19, 1918.
5 SHEETS—SHEET 1.

Witnesses:

Inventor
Walter Wright
by B b Stickney
his Attorney

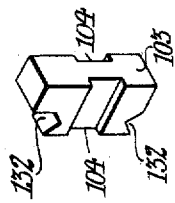
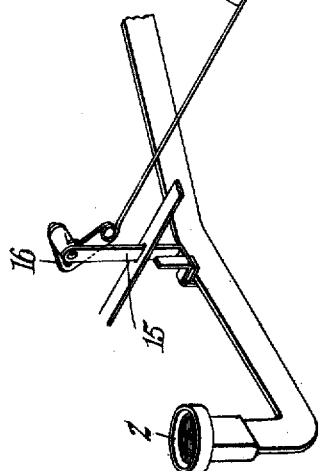
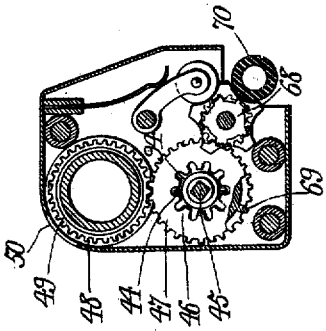
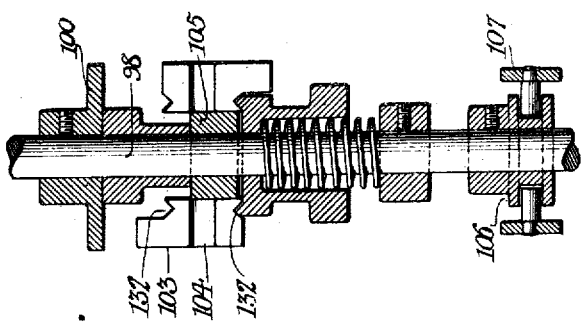

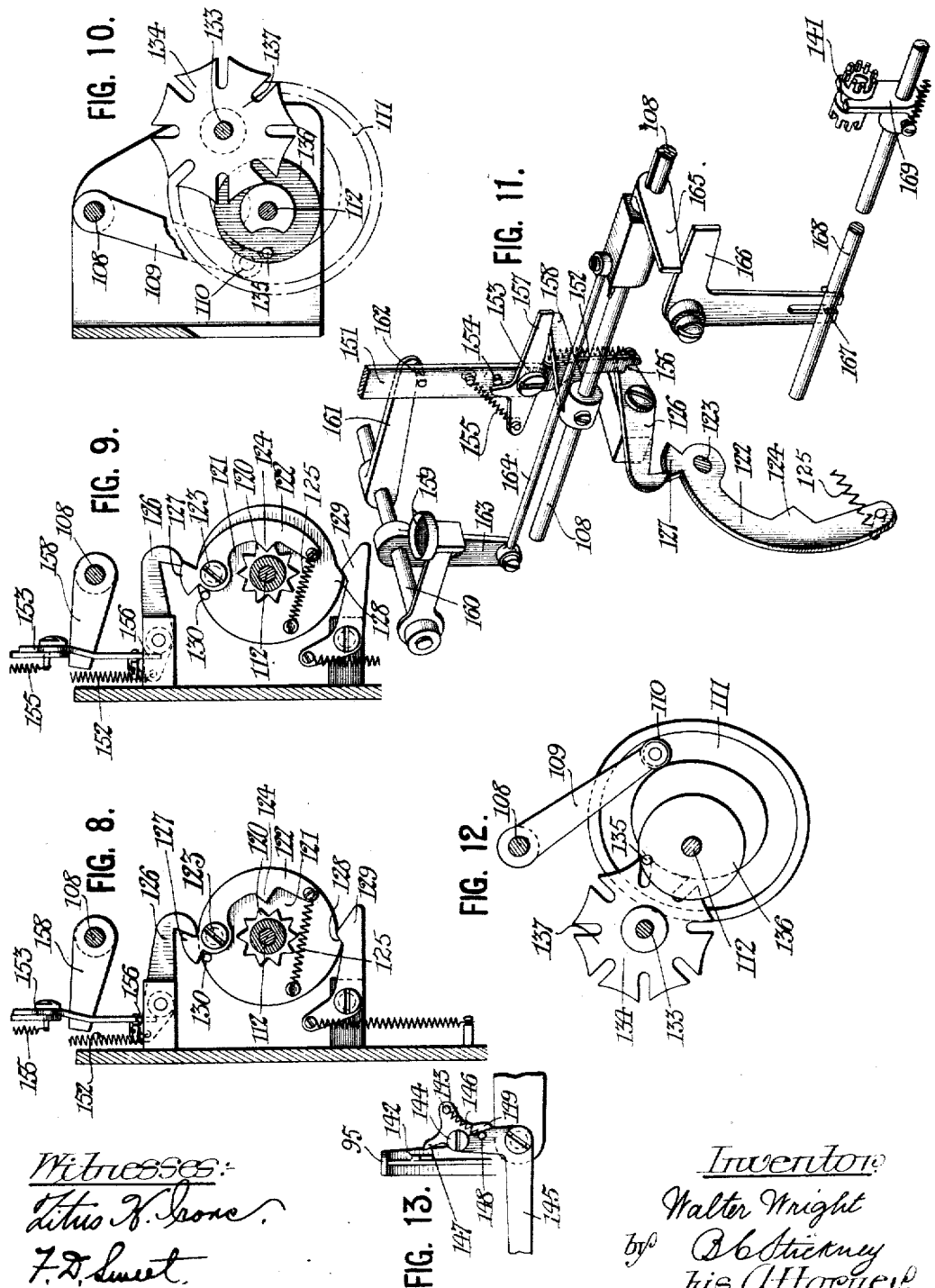

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,259,819.   Specification of Letters Patent.   Patented Mar. 19, 1918.

Application filed November 17, 1911. Serial No. 660,803.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

This invention relates to combined typewriting and computing machines, and more particularly to a power-driven state-controller for conditioning the computing mechanism to add, subtract, or remain neutral, in a selective predetermined order, subject to the movement of the typewriter carriage, when numbers are being written in different columns or adding zones. The invention herein disclosed is an improvement upon a prior application of Wright and Degener, No. 543,603, filed February 12, 1910, and my prior applications, Nos. 569,502, 574,813, 631,115 (now Patent No. 1,244,573), 652,153, and 658,119, filed June 29, 1910, August 1, 1910, June 3, 1911, September 30, 1911 and November 2, 1911, respectively.

In carrying out a complex computation with an Underwood-Wright combined typewriting and computing machine, there is involved much work and thought, and there also exists the danger of errors incident to the shifting of computing heads from one state of adding, subtracting or neutral, to another state; and one object therefore of this invention is to provide improved means for effecting such shifting.

The master wheel and the tens-carrying mechanism of each computing head are usually provided with clutches, shiftable to different positions corresponding to adding, subtracting and neutral or inactive.

I employ setters for shifting the clutches in one direction, corresponding in this case to adding, and a series of tappets for different effects, manipulable so as to be brought successively into coöperation with the shifting mechanism of the clutches, so as to return them or not as the case may be, to one or the other of their other positions corresponding to neutral or subtracting. The tappets may be interchangeable or reversible to obtain different results.

The change in state may be accomplished at each new column of work, and said change of state may advantageously be brought about by ordinary tabulating or analogous stops, with the result that the setting of such a tabulating stop automatically determines the changes. The connections may be such that, as the master wheels and the computing wheels come to an initial relative position at the beginning of each column, the computing heads may be in different states from the preceding column if desired. The above described tappets may be settable to determine what shall be the state in the columns *seriatim* while the stops may be settable to determine the size and location of the columns.

It is often desirable to return to some previous column for some purpose or other, such as correcting an error. Another object therefore of this invention is to enable the reversal of the controlling mechanism, so as to bring the computing heads back to some previous state corresponding to a previous column.

This may be accomplished manually by a special key lever, which automatically connects the driving mechanism for the state controlling mechanism to the source of power, but in a reverse direction to the normal direction, so that it will be returned one step at each actuation of the lever. Further, inasmuch as it is generally desired to return the typewriter carriage to a particular previous column when a previous state of the computing heads is desired, means is provided for enabling the carriage, by a movement in a return direction, to cause, through the intermediary of connecting mechanism, the drive of the state controlling mechanism, by the source of power, in a reverse direction to the normal. This latter means is also utilized to bring the controlling mechanism back to its initial position before the beginning of each new line.

A further object of this invention is to enable the typist to readily ascertain the particular state in the sequence of changes of the states of the computing heads at which said computing heads happen to be at any time. This is accomplished by providing the state controlling mechanism with an indicator which is movable concomitantly with the controlling mechanism, to disclose the several stopping positions of the controlling mechanism.

Other features and advantages will hereinafter appear.

In the accompanying drawings,

Fig. 4 is a diagrammatic perspective view, showing the escapement control as actuated by one of the numeral keys.

Fig. 5 is a vertical section, showing the arrangement of one of the series of tappets for one of the controlling mechanisms.

Fig. 6 is a sectional view of one of the computing heads.

Fig. 7 is a detached perspective view of one of the tappets.

Fig. 8 is a vertical section, showing the automatic clutch for connecting the state controlling mechanism with the power drive, said clutch being in its inactive or disconnected position.

Fig. 9 is a view similar to Fig. 8, showing the elements of the clutch connected so as to drive the controlling mechanism from the source of power.

Fig. 10 is a fragmentary view, partly in section and partly in elevation, showing the Geneva drive for rotating the control shaft after it has been depressed to its lowermost position.

Fig. 11 is a diagrammatic perspective view, showing certain of the elements connected to the clutch in the position illustrated in Fig. 9, and with the manual reverse key lever operated to reverse the direction of drive of the control shaft.

Fig. 12 is a detached view, showing the relative relation between the pin of the Geneva drive and the cam, whereby the rotation of the shaft is obtained, intermediate the down and up stroke of the reciprocation of the shaft.

Fig. 13 is a detail view, showing the inactive position of the trigger which connects the lever with the disconnecting mechanism.

Figure 1:
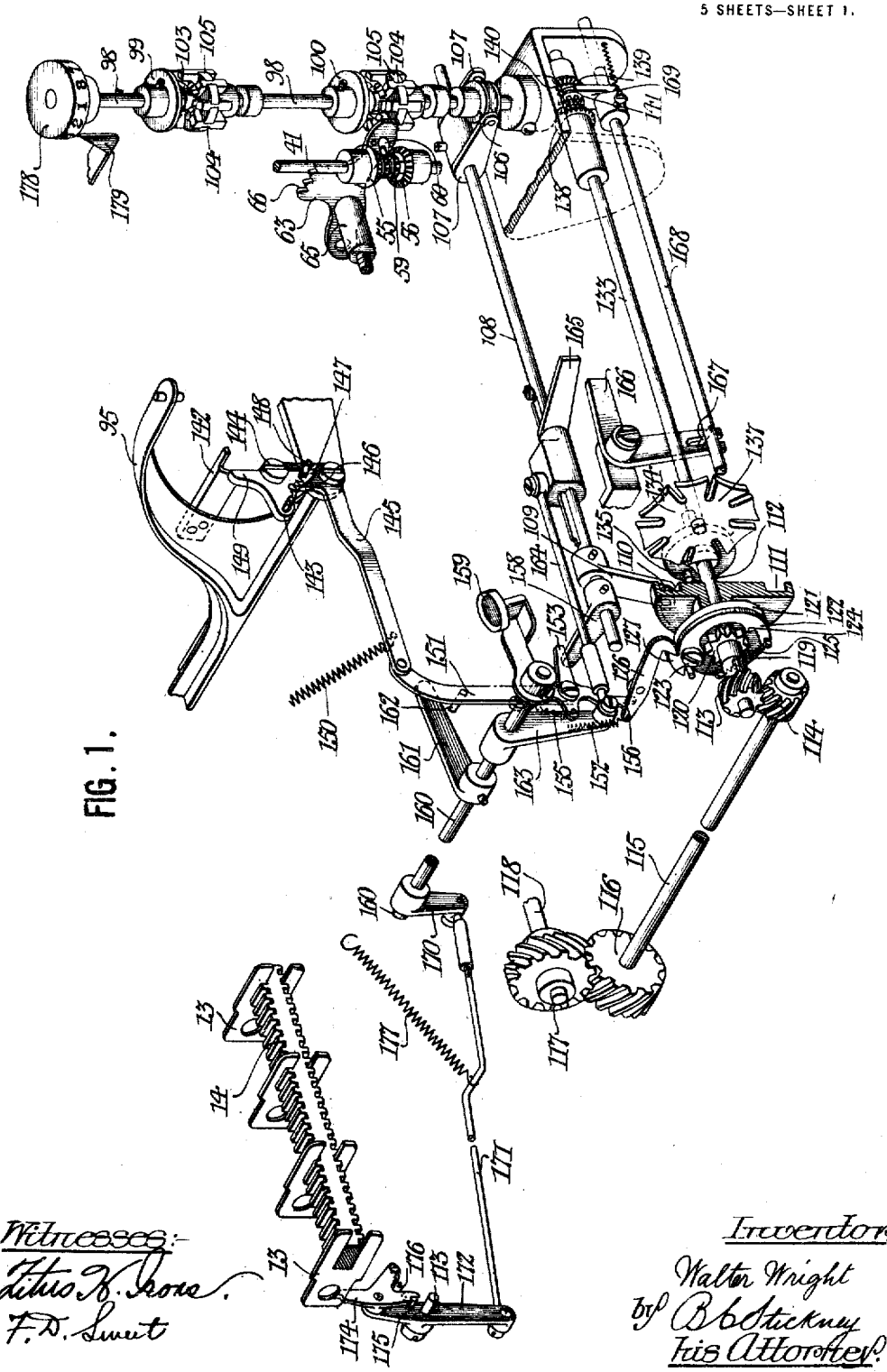
Figure 1 is a fragmentary perspective view bringing out the relative arrangement of the coöperating parts of the improved mechanism, and showing the manual reverse key lever in its unactuated position.

Referring more particularly to the separate parts of this invention as embodied in the form shown in the drawings, 1 indicates letter keys, and 2 indicates numeral keys, which are secured, as is customary in the Underwood typewriter, to key levers 3, which actuate, through the intermediary of bell cranks 4, type bars 5, so that the latter will swing rearwardly against the front side of a platen 6 mounted to rotate on a carriage 7, which travels on one or more track rails 8 under the control of an escapement, indicated in general by the numeral 9, which is actuated at each manipulation of a character key, to feed the carriage 7 step-by-step a letter-space in a letter-feeding direction. The carriage 7 may be also jumped from column to column by actuating tabulating keys 10, which are secured to levers 11, which raise bars 12 into the path of stops 13 adjustably secured on a rack bar 14 carried by said carriage 7. The bars 12 also act in the usual manner to release the escapement mechanism 9, so that the carriage 7 may travel freely until one of the stops 13 is caught by one of the bars 12.

Each of the numeral keys 2, as will be seen more clearly by reference to Fig. 4, may pull down on a link 15, which is secured to a pivotally mounted bell crank 16, whereby a rod 17, also secured to the bell crank 16, may be pulled on to rock a lever 18 about its pivot 19. There is one of these sets of mechanism for each numeral key, and each of the levers 18 is provided with a jack 20, which is arranged in opposition to one of a series of pins 21 disposed on an index wheel 22 in such a manner that they can be projected through the index wheel to the opposite side, so that when the index wheel revolves, said projected pin will be stopped by a detent wheel 23, which is secured to a four-toothed escapement wheel 24. This mechanism is more fully described in said application No. 543,603, and the pin projecting determines the extent of rotation of a shaft 25, to which the index wheel 22 is secured, the extent of rotation as thus determined being dependent on the particular numeral key struck.

The escapement wheel 24 is normally held against rotation by one of a pair of dogs 26 mounted on a shaft 27, which is rocked back and forth, at each actuation of any of the numeral keys, in the manner described in said application No. 543,603, thereby releasing the index wheel 22 so as to permit the rotation of the shaft 25 a predetermined amount, according to the particular pin set up by the particular numeral key.

Figure 2:
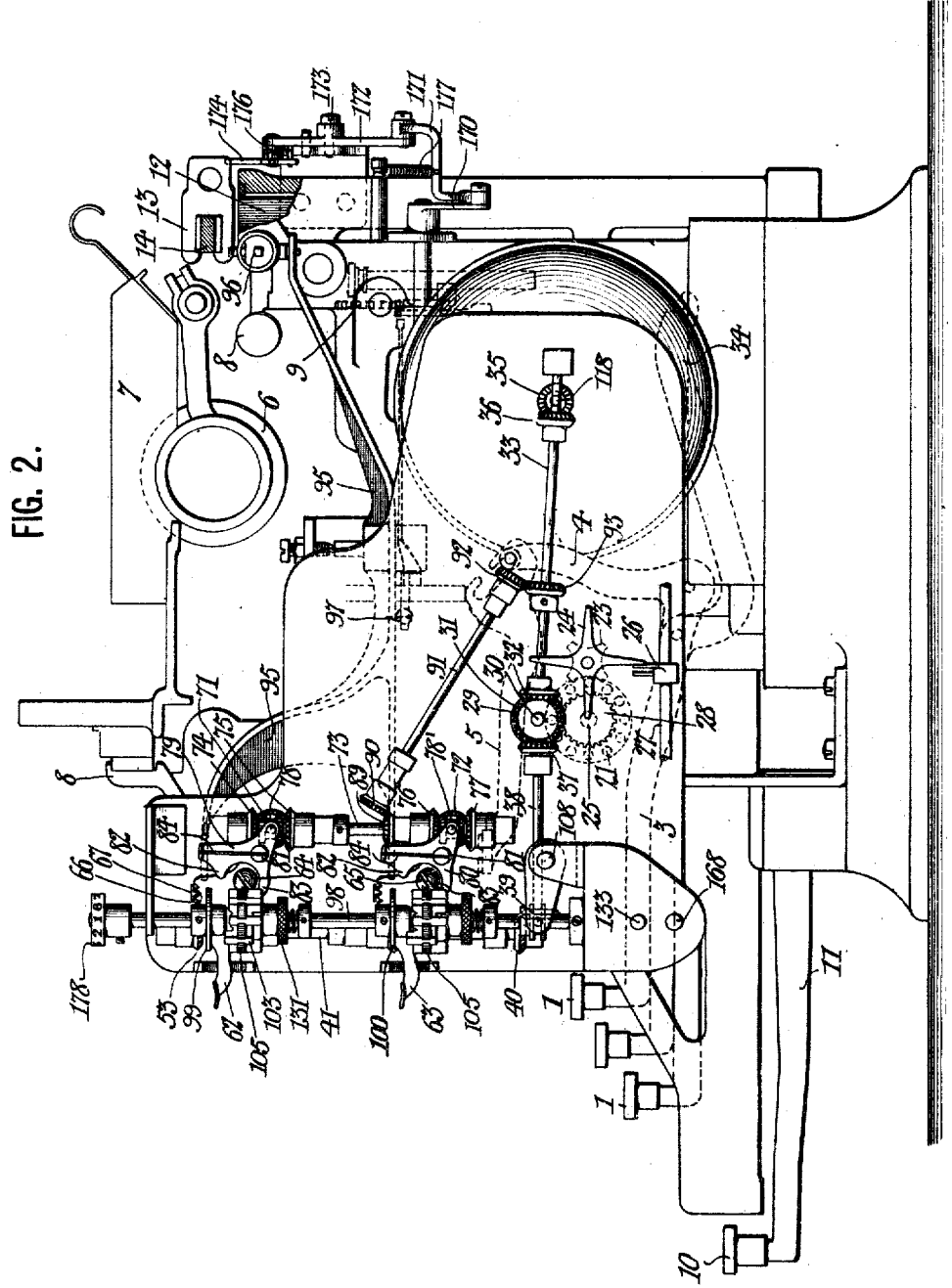
Fig. 2 is a side view in elevation and partly in section.

The shaft 25 is provided with a pinion 28, which meshes with a gear 29, shown in dotted lines in Fig. 2, on the shaft 30. The shaft 30 is provided with a bevel gear 31, meshing with a bevel gear 32 on a shaft 33. This shaft 33 may be under constant tendency to turn, and for this purpose may be driven by a motor 34 through the intermediary of intermeshing bevel gears 35 and 36, the latter of which is secured to the shaft 33. It will thus be seen that the escapement mechanism controlled by the numeral keys 2 will also control the extent of rotation of the bevel gear 29 by the motor 34. Said motor is permitted to rotate when the bevel gear 29 remains stationary, by reason of a slip-clutch not shown, but fully described in said application No. 543,603.

The bevel gear 29 meshes with a bevel gear 37 on a shaft 38, which drives, through intermeshing bevel gears 39 and 40, a vertical shaft 41. The vertical shaft 41 is arranged alongside of one or more computing heads 42 and 43, and is adapted to drive the master wheels of these computing heads, one of which is indicated at 44 in Fig. 6. Each of these master wheels 44 is mounted on a shaft 45, so as to be driven thereby, and may also be splined on the shaft, so as to be capable of being reciprocated back and forth to form the traveling element of the computing head. In the latter event, the master wheel will be brought successively into coöperation with internal gears 46 formed by having inwardly projecting teeth of computing wheels 47 arranged in series, side by side. These computing wheels also have external teeth forming external gears, which mesh with gears 48 carrying dial wheels 49, adapted to exhibit, through an aperture 50 in each computing head, the computation set up.

Each of the shafts 45 which drives a master wheel is provided with a bevel gear, which is indicated in this case by the numerals 51 and 52. The bevel gears 51 and 52 are arranged to be driven in either direction by the appropriate one of pairs of bevel gears facing in opposite directions, and loosely mounted on the shaft 41. These bevel gears, which are arranged in pairs, are indicated by the numerals 53, 54, 55 and 56.

In order to connect the gears 53 to 56 in driving relation with the shaft 41, there are provided clutches 57 and 58, located between the members of each pair, and connected in driving relation with the shaft 41 by being splined thereon, so as to be shiftable to bring the teeth thereon into engagement with corresponding teeth on the inwardly facing sides of the pairs of bevel gears.

To shift the clutches 57 and 58, they are each provided with a circular groove 59 in which engage pins 60 and 61 on shifting levers 62 and 63. The shifting levers 62 and 63 are pivotally mounted at 64 and 65, and project to the front of the machine, where they can readily be manipulated separately by the typist, so as to shift the clutches to change the drive of the master wheel. Each of these levers, and thus the clutches operated thereby, have three positions corresponding, for example, lowermost to adding, intermediate to neutral or inactive, and uppermost to subtracting. To hold the levers in any one of these positions of adjustment, they are provided with three notches 66 engaged by latches 67. It will thus be seen that by individual shifting of the levers 62 and 63 that the state of each computing head, as far as the master wheel is concerned, can be individually changed.

In addition to the master wheel, there are provided other rotary elements in each computing head, for example, the tens-carrying mechanism, indicated generally at 68 in Fig. 6, there being an element of this tens-carrying mechanism coöperating with each computing wheel 47, and brought into coöperation at each complete rotation of each computing wheel by a special tooth 69 carried by each computing wheel, so as to translate a complete rotation of each computing wheel into a tenth of a revolution of the next higher computing wheel.

It is not necessary here to particularly describe the exact operation of this tens-carrying mechanism, as it forms in itself no part of this invention, and it is fully described in said above-mentioned application No. 543,603. It depends, however, for its action on the rotation and direction of rotation of a rubber roller 70, which is driven in the case of each computing head by bevel gears, indicated in Fig. 2 by the numerals 71 and 72. These bevel gears, similar to the master wheel driving bevel gears, mesh with the members of pairs of oppositely facing bevel gears loosely mounted on a shaft 73. These bevel gears, which are loosely mounted on shaft 73, are indicated by the numerals 74, 75, 76 and 77. To connect either one of each pair in driving relation with the shaft 73, there are provided clutches 78 and 78', which are splined on to the shaft 73 and operable by supplementary levers 79 and 80, so as to bring the teeth of the clutches into engagement with corresponding teeth on the inwardly facing sides of the gears 74 to 77.

The supplementary levers 79 and 80 are pivotally mounted on pins 81 secured to the levers 62 and 63, and are capable of a limited motion relative to these levers 62 and 63 determined by fingers 82 and 83 extending on opposite sides of the pivots 64 and 65 of the levers 62 and 63. This play between the main levers 62 and 63 and the supplementary levers 79 and 80 is also taken up by springs 84 secured to the supplementary levers 79 and 80 and to the pins 81. It will thus be seen that the levers 62 and 63 shift the clutches which control the drive of the master wheel and the tens-carrying mechanism of each computing head concomitantly, so that each computing head may be rendered inactive or active and caused to add or subtract.

The shaft 73 is provided with a bevel gear 89, which meshes with a bevel gear 90 on a shaft 91, which is driven from the motor 34 by having a bevel gear 92 meshing with a bevel gear 93 on the shaft 33.

Either the series of dial and computing wheels in each computing head can be made movable to bring the master wheel into coöperation successively with each one of the computing wheels, or else the master wheel itself may be movable. In this case, the master wheels are shown to be movable and to be mounted on arbors 94 shown in the form of sleeves mounted to slide on the shafts 45. Each of the arbors, and thus each of the master wheels, is connected to a lever 95, which is operated in the manner described in my application No. 574,813, filed August 1, 1910, so that a hook or catch 96 carried thereby will be caught successively by the tappets or stops 13, so as to swing the lever a complete stroke for each column of computation. The lever is returned after each stop has done its work by means of a spring 97, as described in my application No. 574,813, so as to bring the master wheels back to a starting position in each computing head, to start a new computation at the beginning of a new column. Of course it is understood, as described in my prior application, No. 574,813, that the same tappets or stops 13 may be used to stop the carriage and swing the lever 95 or some used solely for one of these purposes.

In certain computations, it is necessary to have the computing heads 42 and 43 acting under different states in different columns. It is therefore a part of this invention to relieve the operator of the necessity of shifting the individual levers 62 and 63 at each new column. For this purpose, there is provided a controlling mechanism, which can shift the levers concomitantly at each new column, so as to control the state of each computing head. The controlling mechanism is shown to include a shaft 98, which is mounted so as to slide or shift vertically and also so as to rotate. This shaft is provided with setters 99 and 100, which are adapted to engage, on the initial stroke of the shaft 98, pins 101 and 102 carried by the levers 62 and 63, so as to shift both of these levers, at each actuation of the shaft 98, to their lowermost position corresponding to adding. If it is desired to shift either of these levers back to any other position, such as neutral or subtracting, at the particular instant, one of a plurality of tappets 103 will be brought into coöperation with either one of the pins 101 and 102, so as to swing the corresponding lever a certain amount according to the position and character of the tappet 103. It will be seen, by reference to Fig. 7, that these tappets are provided with reduced portions formed by grooves 104 in the sides of the tappets, whereby they may be supported in radially arranged slots provided in holders 105 secured on the shaft 98, and located on the opposite sides of the pins 101 and 102 from the setters 99 and 100.

It will be seen, by reference to Fig. 7, that the grooves 104 are located at unequal distances from the top and bottom ends of the tappets 103, so that if the longer end is uppermost, the pin, and thus the shifting lever, will be shifted to its uppermost position corresponding to the subtracting action of the computing head. On the other hand, if the shorter end of the tappet 103 is uppermost, the corresponding shifting lever will be only returned a partial distance corresponding to the neutral or inactive condition of the computing head. If no tappet is provided at a particular point, the shifting lever will be left in its lowermost or adding position, and will not be returned at this particular instant by the upward movement of the shaft 98. The shaft 98 is first dropped downward to bring the previously active tappets out of engagement with the pins carried by the shifting lever, and then rotated a fraction of a revolution to bring the next successive position of the holder, and thus the next tappets, if there be tappets in this particular position of the holder, beneath the pins 101 and 102. After the shaft 98 has thus rotated one step, it is lifted upwardly to cause the tappets to swing the shifting levers back to any particular predetermined point. The tappets may be secured in position on the holders by circular spring-pressed detents 131 slidingly mounted on the shaft 98, and adapted to engage V-shaped grooves 132 provided in both the top and bottom ends of the tappets 103, whereby the tappets may be secured with either end uppermost. To thus control the state of the computing heads by the tappets 103 the the shaft 98 is given an intermittent rotating and reciprocating motion.

In order to obtain the combined rotary and reciprocating movement of the shaft 98, and thus of the state controlling mechanism, the shaft 98 is provided with a grooved collar 106, which is engaged by a shifting arm 107 secured to a shaft 108. The shaft 108 is provided also with an arm 109, which has a follower 110 engaging a circular grooved cam 111 secured to an intermittently rotating shaft 112, so that as the cam 111 rotates, it will rock the arm 109 to swing the arm 107, and thus shift the shaft 98 vertically. The shaft 112 has loosely mounted thereon a spiral gear 113, which meshes with a spiral gear 114 on a shaft 115. This shaft 115 is intermittently driven from the motor 34 by having a spiral gear 116 meshing with a spiral gear 117 on a motor shaft 118.

In order to drive the shaft 112, and thus the cam 111, from the spiral gear 113, this spiral gear is provided with a sleeve 119, which has a star wheel 120 secured thereto. Secured on the shaft 112, there is provided a disk or collar 121, which has pivotally mounted thereon a latch 122, which, together with the star wheel 120, forms elements of an automatic clutch tending normally to connect the shaft 112 in driving relation with the spiral gear 113. The latch 122, which is pivotally mounted at 123 on the disk 121, is provided with a tooth 124 normally tending to engage between the teeth of the star wheel 120 by virtue of a spring 125 secured at one end to the disk 121 and at the other end to the latch 122. A disconnector 126, however, shown in the form of a hook pivotally mounted intermediate its ends, tends to hold the latch 122 out of engagement with the star wheel 120, by engaging a projecting lug 127 arranged on the opposite side of the pivot from the tooth 124.

In order to prevent the accidental rotation of the shaft 112 with the spiral gear 113, when the elements of the automatic clutch are disconnected, the disk 121 is provided (Figs. 8 and 9) with a lug or extension 128, which is engaged by a spring-pressed detent 129. The lug 128 is so located that it will be engaged by the spring-pressed detent 129 when the disconnector engages the projecting lug 127 to interrupt the connection of the elements of the automatic clutch. The star wheel 120 limits the swing of the latch 122 in one direction, and a pin 130 limits its movement in the opposite direction.

The rotation of the shaft 112, and thus of the cam 111, will provide for the reciprocation of the shaft 98. In order to obtain an intermittent rotation of the shaft 98, the shaft 112 is connected to a shaft 133 by a Geneva drive, indicated at 134, and shown to include a pin 135 secured on a disk 136, which in turn is secured to the shaft 112 and adapted to rotate a slotted Geneva gear 137 a fraction of a revolution for every complete rotation of the shaft 112.

The shaft 133, to which the slotted Geneva gear 137 is secured, has loosely mounted thereon a pair of oppositely facing bevel gears 138 and 139, which mesh with, and are adapted to drive, a bevel gear 140 secured to the shaft 98. Either one of the bevel gears 138 and 139 are adapted to be brought into driving relation with the shaft 133, so as to determine the direction of rotation of the shaft 98 by means of a clutch 141, which is splined on the shaft 133, and, while normally held in clutch with the gear 139, is capable of being brought into clutch with the gear 138 in the manner to be described.

Means are provided whereby after writing in the units position in any column the shaft 98 is shifted and turned with its tappets, so that the tappets for the succeeding column will appropriately set the computing clutches 57 and 58. For this purpose there is provided a connection between the stops 13 carried by the carriage and the disconnector 126 of the clutch formed by the star wheel 120 and the latch 122. This connection is through the intermediary of the lever 95, which controls the step-by-step feed and return movement of the master wheels through the computing heads. For this purpose, the lever 95 is provided with a finger 142, which is of such form and magnitude that it will engage, during each return movement of the lever, a trigger 143 pivotally mounted at 144 on a bell crank 145. A spring 146 normally holds the shorter arm 147 of the trigger 143 in engagement with a pin 148, but permits the tilting of the trigger 143 when the lever 95 moves step-by-step during the letter feeding movement of the carriage, to feed the master wheels step-by-step through the computing heads, without rocking the bell crank 145.

Whenever a digit is written in the units place in any column, the lever 95 is drawn back by the spring 97 to engage the highest or left-hand computing wheel. This movement of the lever 95 in a return direction, under the impulse of the spring 97 will rotate the shaft 98 to bring the tappets 103 for the next column to effective position. To do this it causes the finger 142 to engage the longer arm 149 of the trigger 143, so as to rock the bell crank lever 145 against the tension of a spring 150. The downward movement of the longer arm of this bell crank lever 145 will cause a depression of a trip 151, which engages, at its lower end, the disconnector 126, and is adapted to actuate the same.

It is desirable to release the disconnector after it has once permitted the engagement of the latch 122 with the star wheel 120, so that after the shaft 112 has rotated one complete revolution, the disconnector 126 will automatically engage the lug 127 and again break the connection of the shaft 112 with the source of power, by disconnecting this automatic clutch. The disconnector 126 will be automatically returned to its disconnecting position by means of a spring 152, providing the trip 151 does not hold it in its inoperative or ineffective position.

Figure 3:
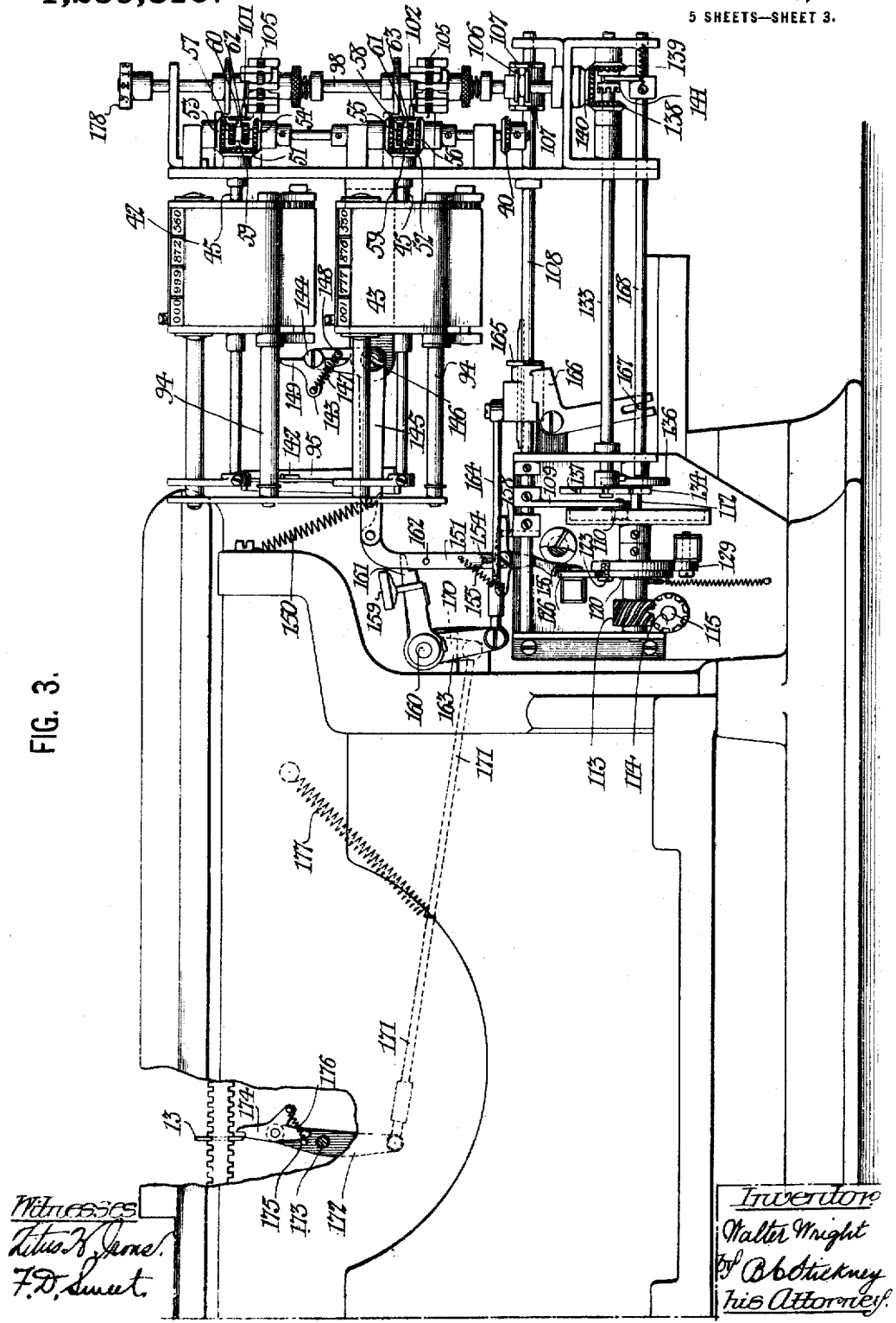
Fig. 3 is a fragmentary front view in elevation, partly broken away to show the underlying structure, and with parts omitted for the sake of simplicity.

In order to render the trip 151 ineffective, after having once actuated the disconnector 126, it is (Figs. 11 and 3) provided at its lower and engaging end with a snapper 153, which is shown in the form of a double bell crank lever pivotally mounted on the body portion of the trip 151, and normally held against a stop pin 154 by means of a spring 155, and in such a position that the lower notched end 156 thereof will tend to engage the disconnector 126.

One arm 157 of the double bell crank lever, which forms the snapper 153, engages a throw-off 158, so that, during the downward movement of the trip 151, this arm 157 will engage the throw-off 158, and disconnect the notched end of the snapper from the disconnector 126. If the throw-off 158, which is shown in the form of an arm, were merely stationary, it might be positive enough, but inasmuch as the rotation of the shaft 112, and thus the return of the latch 122, is very quick, it is desired to have the disconnection of the snapper 153 from the disconnector 126 absolutely positive. The throw-off 158 therefore is shown in the form of an arm secured to the shaft 108, which rocks with the rotation of the cam 111 and the shaft 112, so that after the shaft 112 has been once connected in driving relation with the source of motive power, the arm 158 will be tilted upwardly, rocking the snapper 153, so as to positively disengage it from the disconnector 126.

The above-mentioned connection of the driving mechanism for the state controlling mechanism from the motor is the one normally used in the continuous letter feeding operation of the machine. It is sometimes necessary, however, to return the computing heads to some previous state in order to correct an error or for some other purpose. In order to accomplish this reversal, there is provided a manually operable reverse key, lever 159, which is secured to a rock shaft 160, on which is also provided an arm 161, which is adapted to engage a pin 162 on the trip 151 and depress said trip, to throw off the disconnector and permit the clutching together of the star wheel 120 and the latch 122. The rock shaft 160, however, is also provided with another arm 163, which is connected by means of a link 164 to an actuator 165 splined on the shaft 108, so as to rock therewith, and yet capable of moving along the same. When the key lever 159 is actuated, it will also bring the arm of the actuator 165 above a bell crank lever 166, which is slotted at one end, so as to engage a pin 167 on a slidable rod 168. The rod 168 carries a shifter 169 engaging in a groove in the clutch 141, so that as the shaft 108 is rocked, it will shift the clutch 141 from engagement with the gear 139 into engagement with the gear 138, thus changing the direction of rotation of the shaft 98, when driven through the intermediary of the Geneva drive from the shaft 112.

It may be noted at this point that the pin 135 is so positioned on the disk 136 with respect to the cam groove of the cam 111, that it will engage the Geneva gear 137 after said cam has rocked the shaft 108 to bring the shaft 98 to its lowermost position with the tappets out of engagement with the pins on the shifting levers. It is further to be noted that at this instant, the groove of the cam 111 is arranged practically concentric with the shaft 112, so that it will leave the shaft 98 free from up and down movement. After the pin 135 has driven the Geneva gear 137 so as to rotate the shaft 98 a fraction of a revolution, bringing the next set of tappets under the pins on the shifting levers, then that portion of the cam groove of the cam 111 which changes from the previously mentioned concentric portion will actuate the follower, so as to rock the shaft 108 in the opposite direction, to return the shaft 98 to its uppermost position. This relative arrangement of the cam groove and pin 135 is shown in Fig. 12.

In view of the fact that when the carriage is brought back to begin a new line, the shaft 98 with its tappets, should automatically return to the position it occupied for the first column, and since, when it is desired to bring the computing heads back to some previous state corresponding to some previous column, it is also generally desirable to bring the carriage and typewriting mechanism back to this column, there is also provided a control, for connecting the state controlling mechanism with the power drive, which is operable by the stops carried by the carriage when said carriage moves in a return direction. For this purpose, the rock shaft 160 is provided with another arm 170, which is connected by a link 171 to a lever 172 pivotally mounted intermediate its ends, as at 173, and adapted to be rocked by the stops 13 as they pass in a return direction. The lever 172 is provided with a trip 174, which is pivotally mounted on the lever 172 and held in position against a stop 175 by means of a spring 176, so as to be in a position to be operated by the stops 13 during the return motion of the carriage, and yet so as to rock against the tension of the spring 176 when the stops 13 pass along with the carriage in a letter feeding direction. A spring 177 is provided for returning the rock shaft 160, and the parts connected thereto, to their normal position.

In order that the typist may ascertain readily in what particular column the controlling mechanism for the state of the computing heads is acting, the shaft 98 is provided with an indicator shown in the form of a cylindrical dial 178 having numbers ranging from "1" up. Located in juxtaposition to this dial, and corresponding to the initial position on each holder, there is provided a pointer 179, which will designate a particular numeral on the dial, corresponding to the column which is being computed by the computing head.

In the operation of the device, the carriage 7 may be jumped by the tabulating keys 10 from one column to another. In each column, the traveling elements of the computing heads, which in this instance are shown to be the master wheel, will be moved step by step, through the intermediary of the lever 95, concomitantly with the movement of the carriage 7, and, at the end of the column, will be swung back to begin a new column by the spring 97 swinging the lever 95 back.

Instead of having the operator shift the computing heads individually for the different states which it might be desired to have them act under in the different columns, the lever 95 will, on its return motion, engage the trigger 143, over which it slipped ineffectively during its step-by-step motion, so as to rock the bell crank 145 and depress the trip 151, which will, at the same time, rock the disconnector 126, so as to permit the latch 122 to drivingly engage the star wheel 120, whereby the shaft 112 will be driven from the motor 34. As the shaft 112 rotates, it will first rock the arm 109, so as to turn the shaft 108, whereby the arm 107 will shift the shaft 98 downwardly to the bottom of its full stroke, thus bringing the tappets out of engagement with the pins 101 and 102 on the shifting levers 62 and 63. After this has been accomplished, the cam 111 will rotate, without actuating the follower arm 109, until the pin 135 has engaged the Geneva gear 137 and rotated the shaft 133 a fraction of a revolution, so that the shaft 98 will have been rotated through the intermediary of the clutch 141 and the bevel gears 139 and 140, so as to bring the shaft 98 to its next position, with or without new tappets below the pins 101 and 102.

After this has been accomplished, the cam 111 will again change, as it rotates, so as to rock the arm 109 and the shaft 108 back to its normal position, thus raising the shaft 98 to its highest extent. When the shaft 98 was swung down to its lowest point, the setters 99 and 100 swung the levers 62 and 63, through the intermediary of the pins 101 and 102, to their lowermost positions, corresponding to the adding state of the computing heads. If, during the return upward stroke of the shaft 98, there should be no tappets beneath the pins 101 and 102, the shifting levers would remain in their adding position and the computing heads for the next column would both be adding. If a tappet with the smallest end uppermost is located beneath either or both of the pins 101 and 102, then the corresponding shifting lever would be moved upwardly to an intermediate position in which the clutches would be disconnected from all of the gears, so that neither the master wheel nor the tens carrying mechanism would be active. Again, if a tappet with its largest end uppermost is located beneath one or both of the pins 101 and 102, then the shifting levers and the clutches operated thereby would be swung to their subtracting position, whereby the computing head controlled thereby would be subtracting in the coming column.

It will be seen that as soon as the shaft 112, and thus the cam 111, has made one complete revolution, then the disconnector 126 will engage the extension 127, to operatively disconnect the shaft 112 from the spiral gear 113, by virtue of the fact that the snapper 153 has been positively disengaged from the disconnector 126 by the throw-off arm 158, which has been raised when the shaft 108 was rocked. The detent 129 will have caught the disk 121, and thus the shaft 112, as soon as the disconnector 126 has broken the connection between the shaft 112 and the spiral gear 113. The operation of shifting the controlling mechanism for the computing heads, so as to bring the controlling mechanism in the next step, which may correspond to different states of the computing heads, will be repeated every time the lever 95 is returned to bring the master wheels to their initial positions in the computing heads, that is to say it will occur each time one of the stops 13, corresponding to a new column, brings the carriage to a new column and brings the movable element of the computing heads to the start of a new column.

If it is desired to bring the computing head back to some previous state, corresponding to some previous column, the reverse key lever 159 may be depressed, whereby the trip 151 will be depressed, through the intermediary of the rock shaft 160 and the arm 161, so that the trip 151 will throw off the disconnector 126, permitting the clutching together of the shaft 112 and the spiral gear 113, so as to drive the cam 111 and the shaft 133. At the same time, the arm 163 will be rocked, so as to bring the actuator 165 above the bell crank lever 166, whereby when the cam 111 rocks the shaft 108, it will at the same time shift the clutch 141 into engagement with the gear 138, so as to reverse the direction of drive of the shaft 98 by the shaft 133. Each actuation of the reverse key lever 159 will thus bring the controlling mechanism carried by the shaft 98 back one step, so that by any desired number of actuations of the reversing lever 159, the controlling mechanism can be shifted back to any previous step.

In case it is necessary to bring the carriage back to a position corresponding to a particular column, the controlling mechanism will be concomitantly brought back, so as to bring the computing mechanism into a state, corresponding to that in which it was when the column was first written, by the lever 172 being actuated by the stops 13 which correspond to the special columns, so that the shaft 160 will be rocked, enabling the connection of the shafts 112 and 133 in driving relation with the motor 34, and also shifting the clutch 141 to reverse the direction of drive of the shaft 98. It will be readily seen that at the end of a line, as the carriage is returned to begin a new line, that the stops 13 will reverse the controlling mechanism step-by-step, so as to bring it back to its initial position corresponding to the first column.

If it should be desired to disconnect, so as to interrupt the control of the state of the computing heads from the carriage, the trigger 143 can be thrown from the position indicated in Fig. 1 to the position indicated in Fig. 13, where the shorter arm 147 will be uppermost, but will not project high enough for the finger 142 to come into engagement therewith, to rock the bell crank 145. The spring 146 shifts to opposite sides of the pivot 144, and coöperates with the pin 148 to hold the trigger 143 in either position of adjustment.

Certain features of the invention herein set forth are disclosed and broadly claimed in one or more of the above-mentioned copending applications Nos. 543,603; 569,502; 574,813; 631,115; 652,153 and 658,119, over which the invention herein disclosed and claimed is an improvement. Application No. 543,603 shows the escapement mechanism for controlling the degree of rotation of the computing wheels. Application No. 569,502 shows a power-driven rotary state-controller, for conditioning the computing mechanism to add, subtract, or remain neutral, in a predetermined order, the movement of the state-controller being subject to the movement of a typewriter carriage. Application No. 574,813 shows a machine comprising tabulator stops, and a lever controlled in its movement by said stops for producing relative movement between the computing wheels and their common actuator. Application No. 631,115 shows a lever for transmitting motion from the tabulator stops to the computing mechanism, said lever having a yoke at its forward end providing means for connection with the movable members of two computing heads. Application No. 652,153 shows a state-controller which may be automatically operated in accordance with the movement of the carriage. Application No. 658,119 shows a rotary state-controller provided with setters and adjustable tappets, the controller being manually operated instead of being power-driven. The claims in this case are restricted to patentable subject-matter which is not disclosed in any of the above-mentioned co-pending applications.

Variations may be resorted to within the scope of the invention, and portions of the improvements may be used without others.

Having thus described my invention, I claim:

1. The combination with a computing head having a traveling element, of an oscillating lever for controlling the position of said traveling element, a spring for said lever, controlling mechanism for governing the state of said computing head, and means operated by said lever to cause the actuation of said controlling mechanism.

2. The combination with one or more computing heads, of controlling mechanism for governing the state, or character of work of said computing heads step-by-step according to a predetermined plan, and an indicator for showing what particular step said computing heads are acting in at any particular time.

3. The combination with a typewriter carriage, of one or more computing heads, controlling mechanism for governing the state of said computing heads as to the character of work carried on thereby, mechanism including stops carried by said carriage for determining positions thereof effective as computing zones, and mechanism movable intermittently in alternation with movements of said carriage and controlled by said stops for governing the action of said state-controlling mechanism.

4. The combination with a typewriter carriage, of one or more computing heads, controlling mechanism for governing the state of said computing heads as to the character of work carried on thereby, and mechanism including stops carried by said carriage for initiating periods of activity of said state-controlling mechanism at predetermined points in the travel of said carriage; said state-controlling mechanism including a plurality of tappets arranged to be brought successively into individual operation.

5. The combination with a typewriter carriage, of one or more computing heads, controlling mechanism for governing the state of said computing heads as to the character of work carried on thereby, and stops carried by said carriage for governing the action of said controlling mechanism; said controlling mechanism including a plurality of tappets arranged to be brought successively into individual operation; some of said tappets being spaced apart from each other greater distances than others of said tappets.

6. The combination with a typewriter carriage, of one or more computing heads, controlling mechanism for governing the state of said computing heads as to the character of work carried on thereby, and stops carried by said carriage for governing the action of said controlling mechanism; said controlling mechanism including a plurality of tappets arranged to be brought successively into individual operation; said tappets being interchangeable to vary the effect of said controlling mechanism.

7. The combination with a typewriter carriage, of one or more computing heads, controlling mechanism for governing the state of said computing heads as to the character of work carried on thereby, and stops carried by said carriage for governing the action of said controlling mechanism; said controlling mechanism including a plurality of tappets arranged to be brought successively into individual operation; said tappets being reversible to vary the effect of said controlling mechansm.

8. The combination with a typewriter carriage, of one or more computing heads, controlling mechanism for governing the state of said computing heads as to the character of work carried on thereby, and stops carried by said carriage for governing the action of said controlling mechanism; said stops being adjustable to vary the instant of actuation of said controlling mechanism.

9. The combination with a typewriter carriage, of one or more computing heads, controlling mechanism for governing the state of said computing heads as to the character of work carried on thereby, and stops carried by said carriage for governing the action of said controlling mechanism; said controlling mechanism including a plurality of tappets arranged to be brought successively into individual operation; said stops being adjustable to vary the instant of actuation of said controlling mechanism, and said tappets being adjustable to vary the effect of said controlling mechanism.

10. The combination with a carriage, of one or more computing heads, clutches for determining the character of action of said computing heads, and identical stops carried by said carriage for variably and selectively causing the shifting of said clutches.

11. The combination with a carriage, of one or more computing heads, clutches for determining the character of action of said computing heads, and identical stops carried by said carriage or variably and selectively causing the shifting of said clutches; said stops being adjustable on said carriage to vary the shift of said clutches.

12. The combination with a carriage, of one or more computing heads, clutches for determining the character of action of said computing heads, stops carried by said carriage for timing the shifting of said clutches, and manual means enabling the shifting of said clutches.

13. The combination with a computing head, of a source of power for actuating said computing head, means operated by said source of power for controlling the state of said computing head as to the character of the work carried on thereby, a carriage, and means operated by said carriage at a predetermined point in its movement for setting said state-controlling means in action to effect a change of state.

14. The combination with a computing head, of a source of power for actuating said computing head, means operated by said source of power for controlling the state of said computing head as to the character of the work carried on thereby, a carriage, a series of stops carried by said carriage, and connections between said stops and said first-mentioned means, whereby the position of said carriage may control the actuation of said means.

15. The combination with a carriage, of one or more computing heads, controlling mechanism for governing the state of said computing heads, and means brought in play by the movement of said carriage, for causing the actuation of said controlling mechanism; said means being ineffective during a movement of said carriage in one direction.

16. The combination with a computing head, of a controlling mechanism for governing the state of said computing head, a source of power for actuating said computing head, a typewriter carriage, a lever connected to said typewriter carriage, adapted to move certain parts of said computing head concomitantly with the movement of said carriage, and connections whereby said source of power may operate said controlling mechanism, said connections being brought in play by said lever.

17. The combination with a typewriter carriage, of a computing head, means for actuating certain parts of said computing head from said typewriter carriage, a source of motive power for actuating said computing head, controlling mechanism for governing the state of said computing head, and a trip actuated by said means for enabling the connection of said controlling mechanism with said source of power.

18. The combination with one or more computing heads, of controlling mechanism for governing the state of said computing heads, said controlling mechanism embodying a plurality of tappets, a source of power normally disconnected from said controlling mechanism, and means for effecting state-determining operations of said state-controlling mechanism by establishing temporary connections between said source of power and said controlling mechanism so as to bring said tappets successively into coöperation with said computing heads, said temporarily connected parts being automatically disconnected after each such state-determining operation.

19. The combination with one or more computing heads, of controlling mechanism for governing the state of said computing heads, a source of power normally disconnected from said controlling mechanism, means for connecting said source of power to said controlling mechanism, whereby said controlling mechanism will be manipulated to bring said computing heads to different states according to a predetermined plan, and means for automatically disconnecting said controlling mechanism from said source of power at the end of each state-setting operation.

20. The combination with a typewriter carriage and one or more computing heads, of controlling mechanism for governing the state of said computing heads, a source of power normally disconnected from said controlling mechanism, means for connecting said source of power to said controlling mechanism, whereby said controlling mechanism will be manipulated to bring said computing heads to different states according to a predetermined plan, mechanism for varying the relative positions of certain parts of said computing heads in accordance with movements of said carriage, and connections between said last-mentioned mechanism and said connecting means, whereby the latter will be controlled from the former.

21. The combination with one or more computing heads, of controlling mechanism for governing the state of said computing heads, a source of power normally disconnected from said controlling mechanism, means for connecting said source of power to said controlling mechanism, whereby said controlling mechanism will be manipulated to bring said computing heads to different states according to a predetermined plan, a typewriter carriage, and connections between said connecting means and said typewriter carriage, whereby said connecting means will be controlled from said typewriter carriage.

22. The combination with one or more computing heads, of controlling mechanism for governing the state of said computing heads, a source of power normally disconnected from said controlling mechanism, a plurality of mechanisms each capable of effecting a connection between said source of power and said controlling mechanism, whereby said controlling mechanism will be manipulated to bring said computing heads to different states according to a predetermined plan, and means controlled by operation of one of said connection-effecting mechanisms for reversing the direction of action of said controlling mechanism.

23. The combination with one or more computing heads, of controlling mechanism for governing the state of said computing heads, a source of power normally disconnected from said controlling mechanism, means for connecting said source of power to said controlling mechanism, whereby said controlling mechanism will be manipulated to bring said computing heads to different states according to a predetermined plan, and an indicator for exhibiting the position of said controlling mechanism.

24. The combination with one or more computing heads, of controlling mechanism for governing the state of said computing heads, a source of power, connections between said source of power and said controlling mechanism adapted to reciprocate said controlling mechanism, and connections between said source of power and said controlling mechanism adapted to rotate said controlling mechanism.

25. The combination with one or more computing heads, of controlling mechanism for governing the state of said computing heads, a source of power, connections between said source of power and said controlling mechanism adapted to reciprocate said controlling mechanism, connections between said source of power and said controlling mechanism adapted to rotate said controlling mechanism, and means for reversing the direction of rotation of said controlling mechanism.

26. The combination with one or more computing heads, of a controlling mechanism for governing the state of said computing heads, a reciprocating shaft forming part of said controlling mechanism and rotatable to be effective to govern, a source of power, and a cam operated by said source of power for reciprocating said shaft.

27. The combination with one or more computing heads, of a controlling mechanism for governing the state of said computing heads, a source of power, a cam operated by said source of power for reciprocating said controlling mechanism, and a clutch for connecting said cam to said source of power.

28. The combination with one or more computing heads, of a controlling mechanism for governing the state of said computing heads, a source of power, a cam operated by said source of power for reciprocating said controlling mechanism, and a clutch for connecting said cam to said source of power; said clutch normally tending to connect said cam in driving relation with said source of power.

29. The combination with one or more computing heads, of a controlling mechanism for governing the state of said computing heads, a source of power, a cam operated by said source of power for reciprocating said controlling mechanism, a clutch for connecting said cam to said source of power; said clutch normally tending to connect said cam in driving relation with said source of power, and a disconnector for throwing the elements of said clutch out of driving connection with each other.

30. The combination with one or more computing heads, of a controlling mechanism for governing the state of said computing heads, a source of power, a cam operated by said source of power for reciprocating said controlling mechanism, a clutch for connecting said cam to said source of power; said clutch normally tending to connect said cam in driving relation with said source of power, and a disconnector for throwing the elements of said clutch out of driving connection with each other once in each revolution of said cam.

31. The combination with one or more computing heads, of a controlling mechanism for governing the state of said computing heads, a source of power, a cam operated by said source of power for reciprocating said controlling mechanism, a clutch for connecting said cam to said source of power; said clutch normally tending to connect said cam in driving relation with said source of power, a disconnector for throwing the elements of said clutch out of driving connection with each other, and a trip for releasing said disconnector.

32. The combination with one or more computing heads, of a controlling mechanism for governing the state of said computing heads, a source of power, a cam operated by said source of power for reciprocating said controlling mechanism, a clutch for connecting said cam to said source of power; said clutch normally tending to connect said cam in driving relation with said source of power, a disconnector for throwing the elements of said clutch out of driving connection with each other, a trip for releasing said disconnector, and means for disconnecting said trip from said disconnector after having once actuated the same.

33. The combination with one or more computing heads, of a controlling mechanism for governing the state of said computing heads, a source of power, a cam operated by said source of power for reciprocating said controlling mechanism, a clutch for connecting said cam to said source of power; said clutch normally tending to connect said cam in driving relation with said source of power, a disconnector for throwing the elements of said clutch out of driving connection with each other, a trip for releasing said disconnector, and a member actuating certain parts of said computing heads and also actuating said trip.

34. The combination with one or more computing heads, of a controlling mechanism for governing the state of said computing heads, a source of power, a cam operated by said source of power for reciprocating said controlling mechanism, a clutch for connecting said cam to said source of power; said clutch normally tending to connect said cam in driving relation with said source of power, a disconnector for throwing the elements of said clutch out of driving connection with each other, a trip for releasing said disconnector, a member for actuating certain parts of said computing heads and also actuating said trip, a lever interposed between said trip and said member, and a trigger carried by said lever arranged so as to be engaged by said member during a movement thereof in one direction to rock said lever.

35. The combination with one or more computing heads, of a controlling mechanism for governing the state of said computing heads, a source of power, a cam operated by said source of power for reciprocating said controlling mechanism, a clutch for connecting said cam to said source of power; said clutch normally tending to connect said cam in driving relation with said source of power, a disconnector for throwing the elements of said clutch out of driving connection with each other, a trip for releasing said disconnector, a member for actuating certain parts of said computing heads and also actuating said trip, a lever interposed between said trip and said member, a trigger carried by said lever arranged so as to be engaged by said member during a movement thereof in one direction to rock said lever, and a spring for permitting the movement of said trigger without a movement of said lever during a movement of said lever in the opposite direction.

36. The combination with one or more computing heads, of a controlling mechanism for governing the state of said computing heads, a source of power, a cam operated by said source of power for reciprocating said controlling mechanism, a clutch for connecting said cam to said source of power; said clutch normally tending to connect said cam in driving relation with said source of power, a disconnector for throwing the elements of said clutch out of driving connection with each other, a trip for releasing said disconnector, a member for actuating certain parts of said computing heads and also actuating said trip, a lever interposed between said trip and said member, and a trigger carried by said lever arranged so as to be engaged by said member during a movement thereof in one direction to rock said lever; said trigger being movable to a position out of coöperation with said member.

37. The combination with one or more computing heads, of a controlling mechanism for governing the state of said computing heads, means for actuating said controlling mechanism, a reversing mechanism adapted to be operated by a part of said actuating means, means for inciting said first mentioned means to actuate said controlling mechanism in one direction, and means for inciting said first-mentioned means to coöperate with said reversing mechanism to actuate said controlling mechanism in the opposite direction.

38. The combination with one or more computing heads, of controlling mechanism for governing the state of said computing heads, a typewriter carriage, actuating mechanism for rotating said controlling mechanism during the movement of said carriage in one direction, and additional mechanism, including an automatic reversing device, to coöperate with parts of said actuating mechanism for rotating said controlling mechanism during the movement of said carriage in the opposite direction.

39. The combination with one or more computing heads, of controlling mechanism for governing the state of said computing heads, a typewriter carriage, means for actuating said controlling mechanism in one direction during the movement of said carriage in one direction, and additional means, including an automatic reversing device, to coöperate with parts of said actuating means for actuating said controlling mechanism in the opposite direction during the movement of said carriage in the opposite direction.

40. The combination with one or more computing heads, of controlling mechanism for governing the state of said computing heads, a typewriter carriage, means for actuating said controlling mechanism in one direction during the movement of said carriage in one direction, means for actuating said controlling mechanism in the opposite direction during the movement of said carriage in the opposite direction, and means to coöperate with parts of said last-mentioned means for actuating said controlling mechanism in said last-mentioned direction independently of said carriage.

41. The combination with one or more computing heads, of controlling mechanism for governing the state of said computing heads, means for reciprocating said controlling mechanism and rotating said controlling mechanism in one direction, and means for reciprocating said controlling mechanism and concomitantly reversing the direction of rotation of said controlling mechanism.

42. The combination with one or more computing heads, of controlling mechanism for governing the state of said computing heads, a source of power, a cam, connections between said cam and said source of power, connections between said cam and said controlling mechanism adapted to cause a reciprocation of said controlling mechanism at a rotation of said cam, and connections between said controlling mechanism and said cam adapted to cause a rotation of said controlling mechanism.

43. The combination with one or more computing heads, of controlling mechanism for governing the state of said computing heads, a source of power, a cam, connections between said cam and said source of power, connections between said cam and said controlling mechanism adapted to cause a reciprocation of said controlling mechanism at a rotation of said cam, and connections between said controlling mechanism and said cam adapted to cause a rotation of said controlling mechanism; the relative arrangement of said cam and said first-mentioned connections being such that the rotation of said controlling mechanism will occur intermediate the strokes of reciprocation of said controlling mechanism.

44. The combination with one or more computing heads, of controlling mechanism for governing the state of said computing heads, a source of power, a shaft, means for connecting said shaft in driving relation with said source of power, a cam secured to said shaft for reciprocating said controlling mechanism, and connections between said shaft and said controlling mechanism for rotating said controlling mechanism, including a Geneva drive, whereby a single rotation of said shaft will cause a partial rotation of said controlling mechanism.

45. The combination with one or more computing heads, of a controlling mechanism for governing the state of said computing heads, said controlling mechanism including a shaft and a plurality of tappets arranged around said shaft, said tappets being capable of producing various effects, a source of power, a shaft connectible to said source of power, a cam on said second-mentioned shaft, connections between said cam and said first-mentioned shaft, whereby a rotation of said second-mentioned shaft will reciprocate said first-mentioned shaft, and connections between said second-mentioned shaft and said first-mentioned shaft, whereby a single rotation of said second-mentioned shaft will cause a partial rotation of said first-mentioned shaft.

46. The combination with one or more computing heads, of a controlling mechanism for governing the state of said computing heads, said controlling mechanism including a shaft and a plurality of tappets arranged around said shaft, said tappets being capable of producing various effects, a source of power, a shaft connectible to said source of power, a cam on said second-mentioned shaft, connections between said cam and said first-mentioned shaft, whereby a rotation of said second-mentioned shaft will reciprocate said first-mentioned shaft, connections between said second-mentioned shaft and said first-mentioned shaft, whereby a single rotation of said second-mentioned shaft will cause a partial rotation of said first-mentioned shaft; said last-mentioned connections including a reversible drive, and means for reversing the direction of drive from said second-mentioned shaft to said first-mentioned shaft.

47. The combination with one or more computing heads, of a controlling mechanism for governing the state of said computing heads, said controlling mechanism including a shaft and a plurality of tappets arranged around said shaft, said tappets being capable of producing various effects, a source of power, a shaft connectible to said source of power, a cam on said second-mentioned shaft, connections between said cam and said first-mentioned shaft, whereby a rotation of said second-mentioned shaft will reciprocate said first-mentioned shaft, and connections between said second-mentioned shaft and said first-mentioned shaft, including a Geneva drive to enable a single rotation of said second-mentioned shaft to cause a partial rotation of said first-mentioned shaft.

48. The combination with one or more computing heads, of controlling mechanism for governing the state of said computing heads, said controlling mechanism including a control shaft, a plurality of tappets arranged around said shaft and adapted to be brought in play successively by the successive movements of said shaft, a rock shaft, connections between said rock shaft and said control shaft, a cam shaft, a cam on said cam shaft, connections between said cam and said rock shaft, whereby the rotation of said cam will rock said rock shaft, a pin carried by said cam shaft, a Geneva gear adapted to be driven by said pin, a shaft driven by said Geneva gear, a pair of gears loosely mounted on said last-mentioned shaft, a clutch splined on said last-mentioned shaft and adapted to connect either of said gears with said shaft, and a bevel gear secured to said control shaft and meshing with both of said first-mentioned bevel gears.

49. The combination with one or more computing heads, of controlling mechanism for governing the state of said computing heads, said controlling mechanism including a control shaft, a plurality of tappets arranged around said shaft and adapted to be brought in play successively by the successive movements of said shaft, a rock shaft, connections between said rock shaft and said control shaft, a cam shaft, a cam on said cam shaft, connections between said cam and said rock shaft, whereby the rotation of said cam will rock said rock shaft, a pin carried by said cam shaft, a Geneva gear adapted to be driven by said pin, a shaft driven by said Geneva gear, a pair of gears loosely mounted on said last-mentioned shaft, a clutch splined on said last-mentioned shaft and adapted to connect either of said gears with said shaft, a bevel gear secured to said control shaft and meshing with both of said first-mentioned bevel gears, a source of power, a clutch connecting said cam and said cam shaft with said source of power, and means for bringing said second-mentioned clutch into action.

50. The combination with one or more computing heads, of controlling mechanism for governing the state of said computing heads, said controlling mechanism including a control shaft, a plurality of tappets arranged around said shaft and adapted to be brought in play successively by the successive movements of said shaft, a rock shaft, connections between said rock shaft and said control shaft, a cam shaft, a cam on said cam shaft, connections between said cam and said rock shaft, whereby the rotation of said cam will rock said rock shaft, a pin carried by said cam shaft, a Geneva gear adapted to be driven by said pin, a shaft driven by said Geneva gear, a pair of gears loosely mounted on said last-mentioned shaft, a clutch splined on said last-mentioned shaft and adapted to connect either of said gears with said shaft, a bevel gear secured to said control shaft and meshing with both of said first-mentioned bevel gears, a source of power, a clutch connecting said cam and said cam shaft with said source of power, and a key for concomitantly bringing said second-mentioned clutch into action and shifting said first-mentioned clutch.

51. The combination with one or more computing heads, of controlling mechanism for governing the state of said computing heads, said controlling mechanism including a control shaft, a plurality of tappets arranged around said shaft and adapted to be brought in play successively by the successive movements of said shaft, a rock shaft, connections between said rock shaft and said control shaft, a cam shaft, a cam on said cam shaft, connections between said cam and said rock shaft, whereby the rotation of said cam will rock said rock shaft, a pin carried by said cam shaft, a Geneva gear adapted to be driven by said pin, a shaft driven by said Geneva gear, a pair of gears loosely mounted on said last-mentioned shaft, a clutch splined on said last-mentioned shaft and adapted to connect either of said gears with said shaft, a bevel gear secured to said control shaft and meshing with both of said first-mentioned bevel gears, a source of power, a clutch connecting said cam and said cam shaft with said source of power, a typewriter carriage, and connections actuated by said typewriter carriage for bringing said second-mentioned clutch into action and concomitantly shifting said first-mentioned clutch.

52. The combination with one or more computing heads, of controlling mechanism for governing the state of said computing heads, said controlling mechanism including a control shaft, a plurality of tappets arranged around said shaft and adapted to be brought in play successively by the successive movements of said shaft, a rock shaft, connections between said rock shaft and said control shaft, a cam shaft, a cam on said cam shaft, connections between said cam and said rock shaft, whereby the rotation of said cam will rock said rock shaft, a pin carried by said cam shaft, a Geneva gear adapted to be driven by said pin, a shaft driven by said Geneva gear, a pair of gears loosely mounted on said last-mentioned shaft, a clutch splined on said last-mentioned shaft and adapted to connect either of said gears with said shaft, a bevel gear secured to said control shaft and meshing with both of said first-mentioned bevel gears, a source of power, a clutch connecting said cam and said cam shaft with said source of power, a typewriter carriage, and connections actuated by said typewriter carriage for bringing said second-mentioned clutch into action and concomitantly shifting said first-mentioned clutch, said last-mentioned connections including a trip permitting the movement of said carriage in one direction without operating said last-mentioned connections.

53. The combination with one or more computing heads, of controlling mechanism for governing the state of said computing heads, means for driving said controlling mechanism including a shiftable clutch, clutch-shifting mechanism, and means for concomitantly bringing said driving means into action and setting said clutch-shifting mechanism so as to be automatically operated by a part of said driving means to shift said clutch.

54. The combination with one or more computing heads, of controlling mechanism for governing the state of said computing heads, said controlling mechanism including a shaft and tappets arranged around said shaft to be brought in play successively by the successive movements of said shaft, a gear carried by said shaft, a pair of loosely mounted gears meshing with said first-mentioned gear, a clutch for driving the members of said pair of gears in opposite directions, and means for shifting said clutch.

55. The combination with one or more computing heads, of controlling mechanism for governing the state of said computing heads, said controlling mechanism including a shaft and tappets arranged around said shaft to be brought in play successively by the successive movements of said shaft, a gear carried by said shaft, a pair of loosely mounted gears meshing with said first-mentioned gear, a clutch for driving the members of said pair of gears in opposite directions, and a reverse key lever for shifting said clutch.

56. The combination with one or more computing heads, of controlling mechanism for governing the state of said computing heads, said controlling mechanism including a shaft and tappets arranged around said shaft to be brought in play successively by the successive movements of said shaft, a gear carried by said shaft, a pair of loosely mounted gears meshing with said first-mentioned gear, a clutch for driving the members of said pair of gears in opposite directions, a typewriter carriage, a plurality of stops carried by said carriage, and connections between said stops and said clutch, whereby the movement of said carriage may shift said clutch.

57. The combination with one or more computing heads, of controlling mechanism for governing the state of said computing heads, said controlling mechanism including a shaft and tappets arranged around said shaft to be brought in play successively by the successive movements of said shaft, a gear carried by said shaft, a pair of loosely mounted gears meshing with said first-mentioned gear, a clutch for driving the members of said pair of gears in opposite directions, a typewriter carriage, a plurality of stops carried by said carriage, and connections between said stops and said clutch, whereby the movement of said carriage may shift said clutch; said connections including a trip permitting a movement of said carriage in one direction without affecting said connections.

58. The combination with one or more computing heads, of a controlling mechanism for governing the state of said computing heads, means for shifting said controlling mechanism, a source of power, and a clutch for connecting said means with said source of power, comprising a star wheel, a latch, and a spring normally tending to draw said latch into driving connection with said star wheel.

59. The combination with one or more computing heads, of a controlling mechanism for governing the state of said computing heads, means for shifting said controlling mechanism, a source of power, a clutch for connecting said means with said source of power, comprising a star wheel, a latch, and a spring normally tending to draw said latch into driving connection with said star wheel, and a disconnector for manipulating said latch after a single revolution of said clutch from engagement with said star wheel.

60. The combination with one or more computing heads, of a controlling mechanism for governing the state of said computing heads, means for shifting said controlling mechanism, a source of power, a clutch for connecting said means with said source of power, comprising a star wheel, a latch, and a spring normally tending to draw said latch into driving connection with said star wheel, a disconnector for manipulating said latch after a single revolution of said clutch from engagement with said star wheel, and means for disconnecting said disconnector from said latch.

61. The combination with one or more computing heads, of a controlling mechanism for governing the state of said computing heads, driving mechanism rotating said controlling mechanism, shifting mechanism for changing the direction of rotation of said controlling mechanism by said driving mechanism, an actuator for manipulating said shifting mechanism, and means for reciprocating said controlling mechanism adapted to actuate said actuator.

62. The combination with one or more computing heads, of a controlling mechanism for governing the state of said computing heads, driving mechanism rotating said controlling mechanism, shifting mechanism for changing the direction of rotation of said controlling mechanism by said driving mechanism, an actuator for manipulating said shifting mechanism, means for reciprocating said controlling mechanism adapted to actuate said actuator, said actuator being normally out of coöperative engagement with said shifting mechanism, and means for bringing said actuator into coöperative relation with said shifting mechanism.

63. The combination with one or more computing heads, of controlling mechanism for said computing heads, said controlling mechanism embodying one or more holders having a plurality of positions corresponding to different steps in the operation of the controlling mechanism, tappets in certain of said positions, and an indicator having numerals to correspond with each of said positions.

64. The combination with one or more computing heads, of controlling mechanism for governing the state of said computing heads, a rock shaft for actuating said controlling mechanism, an actuator splined on said rock shaft, gearing for actuating said controlling mechanism, shifting means operable by said actuator at the rocking of said rock shaft to reverse the drive of said controlling mechanism by said gearing, and means for sliding said actuator along said rock shaft.

65. The combination with typewriting mechanism for writing a series of columns of figures, of computing mechanism for computing said series of columns of figures, including a plurality of computing heads, and automatic mechanism comprising a part adapted to move a step at the beginning of each computing column for controlling the state of said computing heads.

66. The combination with a computing head, of a clutch for determining the state of said computing head, a setter for shifting said clutch in one direction, a series of tappets successively and individually operative in alternation with the setting operations of said setter to shift said clutch in the opposite direction, a source of power and means for connecting said source of power so as to actuate said setter and said tappets.

67. The combination with a computing head, of a typewriter carriage, a clutch controlling the state of said computing head, a setter for shifting said clutch in one direction, tappets successively and individually operative to shift said clutch in the opposite direction, said setter being effective and ineffective in alternation with individual members of said tappets, and means controlling the movements of said setter and said tappets from said carriage.

68. The combination with a computing mechanism, of controlling means for governing the state of said computing mechanism, a normally disconnected source of power for driving said controlling means, a traveling carriage, and means for enabling the connection of said controlling means with said source of power at predetermined points in the travel of said carriage.

69. The combination with a computing mechanism, of controlling means comprising a sequence of members for governing the state of said computing mechanism according to a predetermined sequence, a carriage, connections enabling said carriage to control the actuation of said controlling means according to the position of said carriage, and means independent of said carriage for controlling the actuation of said controlling means independent of the position of said carriage.

70. The combination with a computing mechanism, of controlling means for governing the state of said computing mechanism according to a predetermined sequence, means for driving said controlling means in a certain direction, means, including a reversing device, for driving said controlling means in the opposite direction to bring it back to a normal starting position, and means, including and subject to control by a single operating key, to coöperate with part of said last-mentioned driving means for driving said controlling means in a single step in said reverse direction.

71. The combination with a typewriting mechanism including a typewriter carriage, for writing a series of columns of figures, of a computing mechanism for computing said series of columns of figures and capable of existing under a plurality of different states, and automatic mechanism detached from and normally independent of the movements of said carriage and yet controlled by said carriage so as to be brought in play before the writing of each column in order to control the state of said computing mechanism for each column.

72. The combination with a carriage, of one or more computing heads, state-controlling means, including clutches and differentiated setting elements therefor for determining the character of action of said computing heads, and means including tappets carried by said carriage, for shifting said state-controlling means.

73. The combination with a computing mechanism, of state controlling mechanism for governing the character of action of said computing mechanism, a carriage, stops carried by said carriage, a train of connections between said stops and said state controlling mechanism, enabling said stops to control the actuation of said controlling mechanism in one direction of movement of said carriage, and another train of connections for enabling said stops to control the action of said state controlling mechanism in the opposite direction of movement of said carriage.

74. The combination with a computing mechanism, of controlling means for governing the state of said computing mechanism, a normally disconnected source of power for driving said controlling means, and means for intermittently connecting said controlling means with said source of power to effect a step-by-step action of said controlling means.

75. The combination with a computing mechanism, of a rotary controlling means for governing the state of said computing mechanism, a traveling carriage, a carriage-controlled means for effecting a rotation of said controlling means in one direction, and separate carriage-controlled means, including an automatic reversing mechanism, to coöperate with part of said first-mentioned carriage-controlled means for effecting a rotation of said controlling means in the opposite direction.

76. The combination with a computing mechanism, of a rotary controlling means for governing the state of said computing mechanism, a traveling carriage, a carriage-controlled means for effecting a rotation of said controlling means in one direction, and manual means independent of said carriage for effecting a rotation of said controlling means in the opposite direction.

77. The combination with a computing mechanism, of a rotary controlling means for governing the state of said computing mechanism, means for rotating said controlling means in a given direction to effect a predetermined sequence of action of said controlling means, so as to afford a series of predetermined states of said computing mechanism, and other means, including an automatic reversing device to coöperate with parts of said first-mentioned rotating means, for rotating said controlling means in the opposite direction, to obtain any previous state of said computing mechanism.

78. The combination with a typewriter carriage, of a computing head having a traveling element, a stop carried by said carriage for intermittently catching said traveling element and carrying it along, and controlling mechanism controlled from said traveling element for governing the state of said computing head.

79. In a combined typewriting and computing machine, the combination with a plurality of computing heads and a carriage traveling to determine computing zones for the several heads, of tabulating stops settable for positioning said carriage, independently settable tappets to determine how said heads shall compute, and automatic means for causing said tappets to be selectively effective on said heads for computing zones determined independently by said stops.

80. In a combined typewriting and computing machine, the combination with a plurality of computing heads and a traveling carriage, settable for different computing zones, of a traveling member forming part of each computing head, a traveling means for catching said traveling members to cause them to travel with said carriage, independently settable tappets to selectively determine how said heads shall compute, and automatic means controlled to correspond with periods of movement of said traveling member for causing said tappets to be effective on said heads for zones determined by said carriage.

81. In a combined typewriting and computing machine, the combination with a traveling carriage and a plurality of computing heads, of tabulating stops settable on said carriage, separate tappets settable to determine selectively how said heads shall operate, and means whereby in the run of said carriage said stops intermittently make said tappets effective.

82. In a combined typewriting and computing machine, the combination with a traveling carriage and a plurality of computing heads, of tabulating stops settable on said carriage, separate tappets settable to selectively determine how said heads shall operate, means whereby in the run of said carriage said stops intermittently make said tappets effective, and a power-driven device for so moving said tappets.

83. In a combined typewriting and computing machine, the combination with a plurality of computing heads and a traveling carriage, of tabulating stops settable for positioning said carriage and determining computing zones, a controlling device to determine how said heads shall compute, and automatic means for inciting said controlling device to action to be selectively effective on said heads at computing zones determined by said stops.

84. In a combined typewriting and computing machine, the combination with a plurality of computing heads and a traveling carriage, of tabulating stops settable for positioning said carriage and determining computing zones, a traveling member forming part of each computing head, means for causing said traveling members to travel with said carriage, a controlling device to selectively determine how said heads shall compute, and automatic means under the control of said first-mentioned means for causing said controlling device to be effective on said heads at computing zones determined by said stops.

85. In a combined typewriting and computing machine, the combination with a traveling carriage and a plurality of computing heads, of tabulating stops settable on said carriage, a controlling device to determine selectively how said heads shall operate, and means whereby in the run of said carriage said stops intermittently make said controlling device effective.

86. In a combined typewriting and computing machine, the combination with a traveling carriage and a plurality of computing heads, of tabulating stops settable on said carriage, a controlling device settable to selectively determine how said heads shall operate, means whereby in the run of said carriage said stops shall intermittently make said controlling device effective, and a power drive for so making said controlling device effective.

87. In a combined typewriting and computing machine, the combination with a traveling carriage, of a cross computing device intermittently connected to said carriage and a device set in motion by writing in the units place in one column to determine the character of the computation in the next column effective concomitantly with the writing in the units place in the previous column.

88. In a combined typewriting and computing machine, the combination with a traveling carriage, of a lever effective in the letter-feeding of said carriage to determine the nature of computation, and trip-operating stops to determine the nature of computations on the return of said carriage.

89. In a combined typewriting and computing machine, the combination with a computing head and a traveling carriage, of tabulating stops settable for positioning said carriage, independently settable tappets to determine how said head shall compute, and means for causing said tappets to be effective on said head at moments determined by said stops.

90. In a combined typewriting and computing machine, the combination with a traveling carriage and a computing head, of tabulating stops settable on said carriage, separate tappets settable to determine how said head shall operate, and means whereby in the run of said carriage said stops intermittently make said tappets effective.

91. In a combined typewriting and computing machine, the combination with a traveling carriage and a computing head, of tabulating stops settable on said carriage, separate tappets settable to determine how said head shall operate, means whereby in the run of said carriage said stops intermittently make said tappets effective, and a power-driven device for moving said tappets.

92. In a combined typewriting and computing machine, the combination with a plurality of computing heads, of numeral keys, a traveling carriage, settable tabulating stops carried by said carriage for positioning it, means intermediate each computing head and said keys for determining how said keys shall be effective on said head, tappets settable to determine separately for each head how said intermediate means shall be effective, and means under the control of said stops for determining how said tappets shall be effective.

93. In a combined typewriting and computing machine, the combination with a plurality of computing heads, of numeral keys, a traveling carriage, settable tabulating stops carried by said carriage for positioning it, means intermediate each computing head and said keys for determining how said keys shall be effective on said head, tappets settable to determine separately for each head how said intermediate means shall be effective, means under the control of said stops for determining how said tappets shall be effective, and a source of power for so controlling the tappets under control of the stops.

94. The combination with one or more computing heads, of controlling mechanism for governing the state of said heads, said controlling mechanism including a series of tappets, means for intermittently moving said tappets by groups into an effective position, and for imparting operating movements thereto in alternation with said intermittent positioning movements, and a reversing device for reversing the order of operation of said controlling mechanism.

95. The combination with one or more computing heads, of a controlling mechanism for governing the state of said computing heads, a source of power for driving said controlling mechanism, shifting mechanism for reversing the order of operation of said controlling mechanism, an actuator for operating said reversing mechanism, means for reciprocating said controlling mechanism adapted to also operate said actuator, said actuator being normally out of coöperative engagement with said shifting mechanism, and means for bringing said actuator into coöperative relation with said shifting mechanism.

96. The combination with a computing mechanism, of a state-controlling mechanism for governing the character of action of said computing mechanism, a carriage, settable stops carried by said carriage, a device adapted to be intermittently moved *seriatim* by said stops to control the actuation of said controlling mechanism in one direction of movement of said carriage, and means for enabling said stops to control the action of said state-controlling mechanism in the opposite direction of movement of said carriage.

97. The combination with a computing mechanism, of a carriage traveling to determine different computing zones, and state-controlling mechanism automatically advancing only at times with the travel of said carriage, varying the character of computation carried on by said computing mechanism for different computing zones.

98. The combination with a computing mechanism, of a carriage traveling to determine different computing zones, state-controlling mechanism automatically advancing only at times with the travel of said carriage, varying the character of computation carried on by said computing mechanism for different computing zones, and synchronizing means for according the condition of said state-controlling mechanism with a computing zone as determined by said carriage after said carriage has passed such zone and returned to the same.

99. The combination with a computing mechanism, of a carriage traveling to determine different computing zones, state-controlling mechanism automatically advancing only at times with the travel of said carriage, varying the character of computation carried on by said computing mechanism for different computing zones, and reversing means for retracing the movements of said state-controlling mechanism step by step as said carriage returns zone by zone.

100. The combination with a computing mechanism, of a carriage traveling to determine computing zones for said computing mechanism, state-controlling mechanism for determining the character of computation for the several zones of said computing mechanism, said state-controlling mechanism and said carriage having their advancing and returning movements automatically synchronized so as to take place zone for zone, the state-controlling mechanism movements being intermittent for a continuous movement of the carriage, advancing solely at times with the advancing movement of the carriage, and retracing its steps solely at times with the return movement of the carriage, and lying dormant in between such movements while the carriage continues its movements throughout the range of each zone.

101. The combination with a traveling carriage for determining computing zones, of state-controlling mechanism for determining the character of computation carried on in said computing zones, one or more lugs carried by said carriage, and a plurality of computing heads controlled from a single one of said lugs through the intermediary of said state-controlling mechanism, as to the character of computations carried on thereby.

102. The combination with computing mechanism, of a state-controlling mechanism for governing the character of computation of said computing mechanism, a carriage traveling to determine computing zones, tabulating mechanism for determining the stopping points or zones of said carriage, and tabulating stops carried by said carriage, coöperating with said tabulating mechanism to determine computing zones in a run of said carriage, and also coöperating with said state-controlling mechanism to determine the character of computation for such computing zones.

103. The combination with computing mechanism, of denomination-selecting mechanism for said computing mechanism, state-controlling mechanism for said computing mechanism, a carriage traveling to determine computing zones, tabulating mechanism for said carriage, and tabulating stops carried by said carriage, coöperating with said tabulating mechanism to determine the position of said carriage for different computing zones, with said denomination-selecting mechanism to determine the denominational selections for computing zones, and with said state-controlling mechanism to determine the character of computations in said computing zones.

104. The combination with computing mechanism, of a carriage traveling to determine computing zones, state-controlling mechanism for governing the character of computation for said computing zones, said carriage and said state-controlling mechanism being separately driven, and automatic synchronizing means for keeping the action of said state-controlling mechanism in step with zones determined by said carriage, by giving said state-controlling mechanism intermittent movements for a continuous traveling movement of said carriage.

105. In a combined typewriting and computing machine, the combination with numeral keys and a plurality of gangs of computing wheels, of a typewriter carriage, a tabulating mechanism comprising stops for positioning said carriage, and means intermittently set in operation by said stops for separately and variably connecting said keys to said gangs.

WALTER WRIGHT.

Witnesses:
PAUL ZIRON,
C. RIPLEY.

Copies of this patent may be obtained for five cents each, by addressing the "Commissioner of Patents, Washington, D. C."